May 29, 1934.   W. T. STEPHENS   1,960,833
SELF LOCKING DUMP BODY
Filed June 9, 1932   3 Sheets-Sheet 1
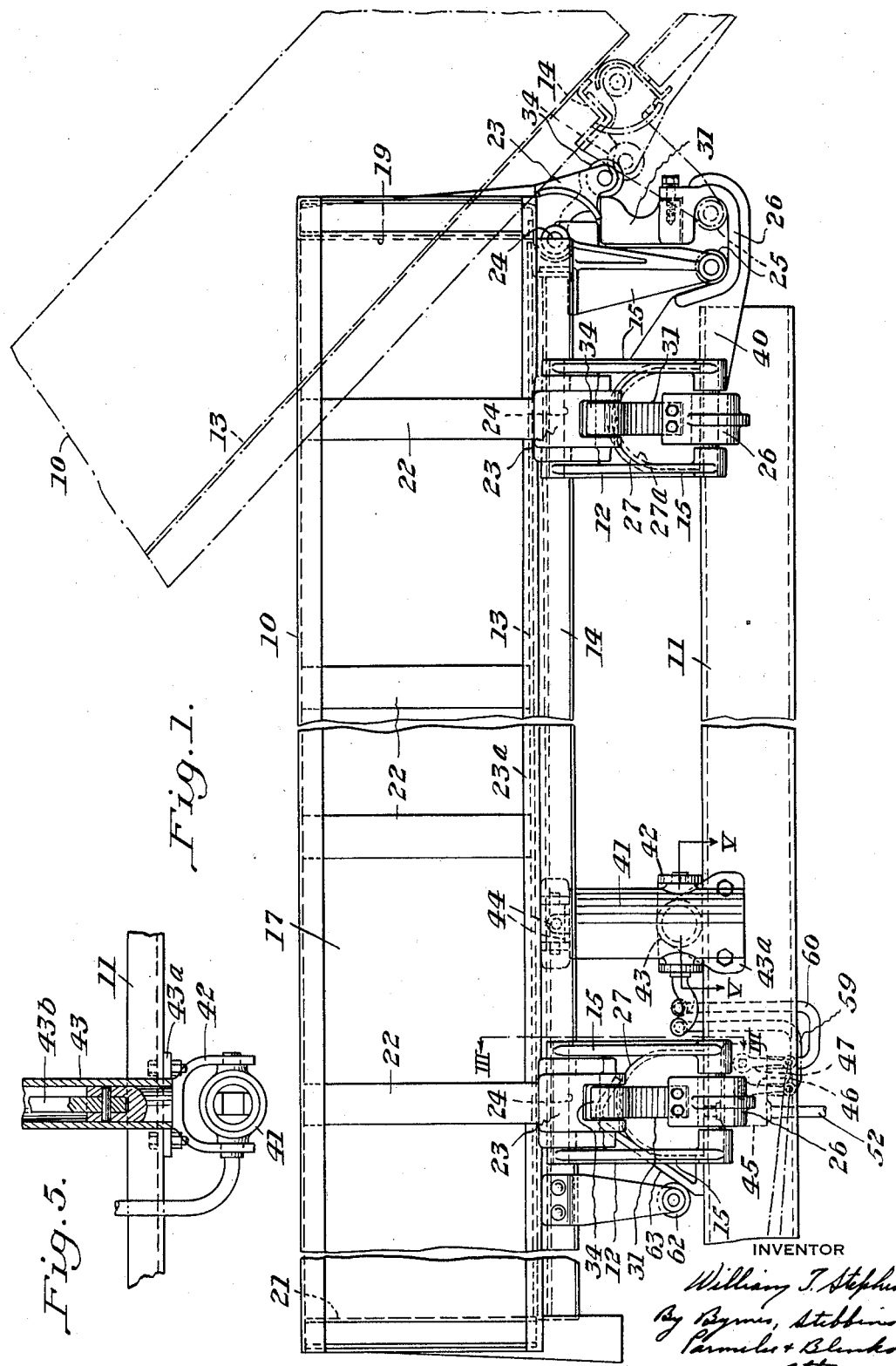
INVENTOR
William T. Stephens
By Byrnes, Stebbins,
Parmelee & Blenko
attorneys

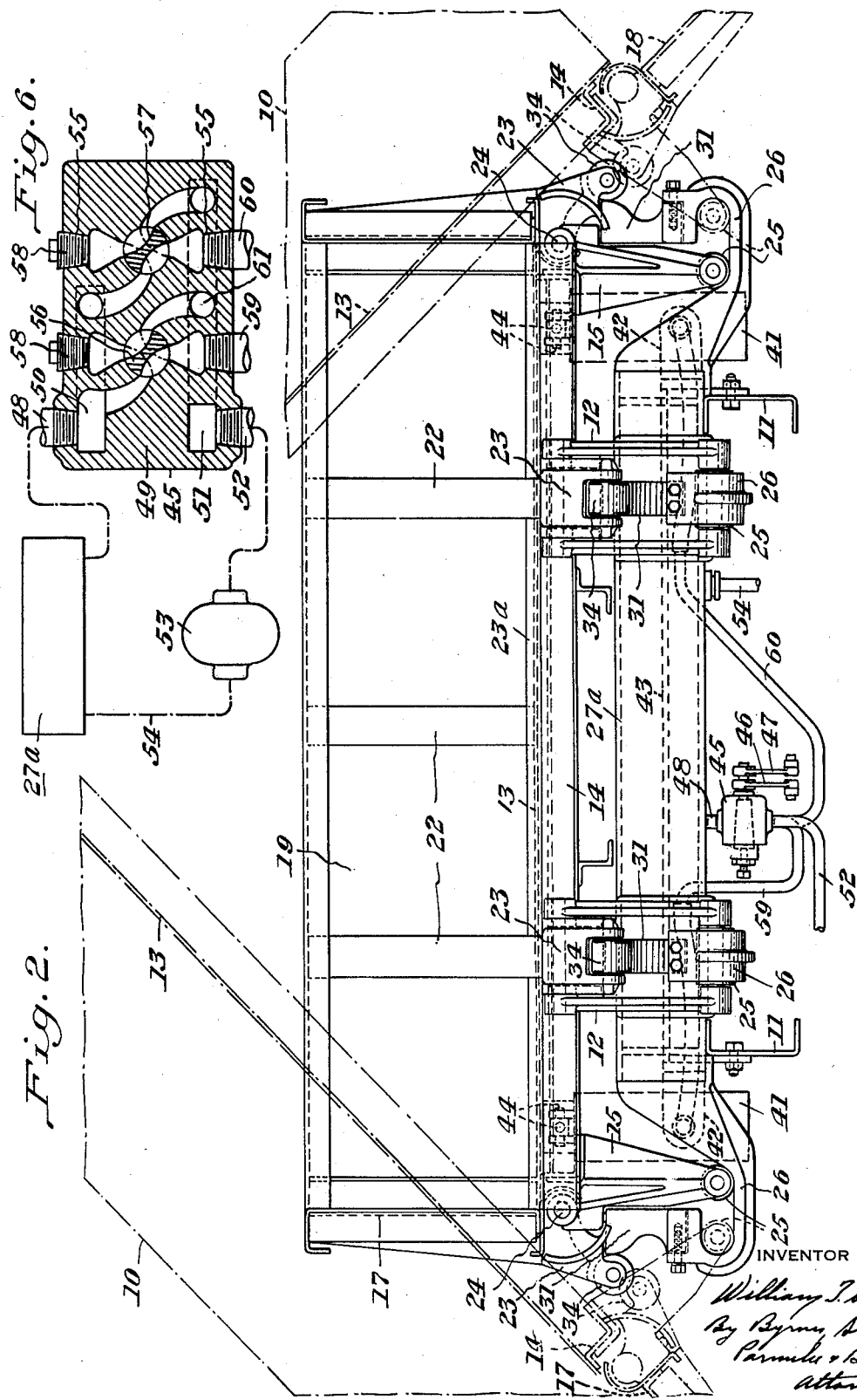

May 29, 1934.  W. T. STEPHENS  1,960,833
SELF LOCKING DUMP BODY
Filed June 9, 1932   3 Sheets-Sheet 3
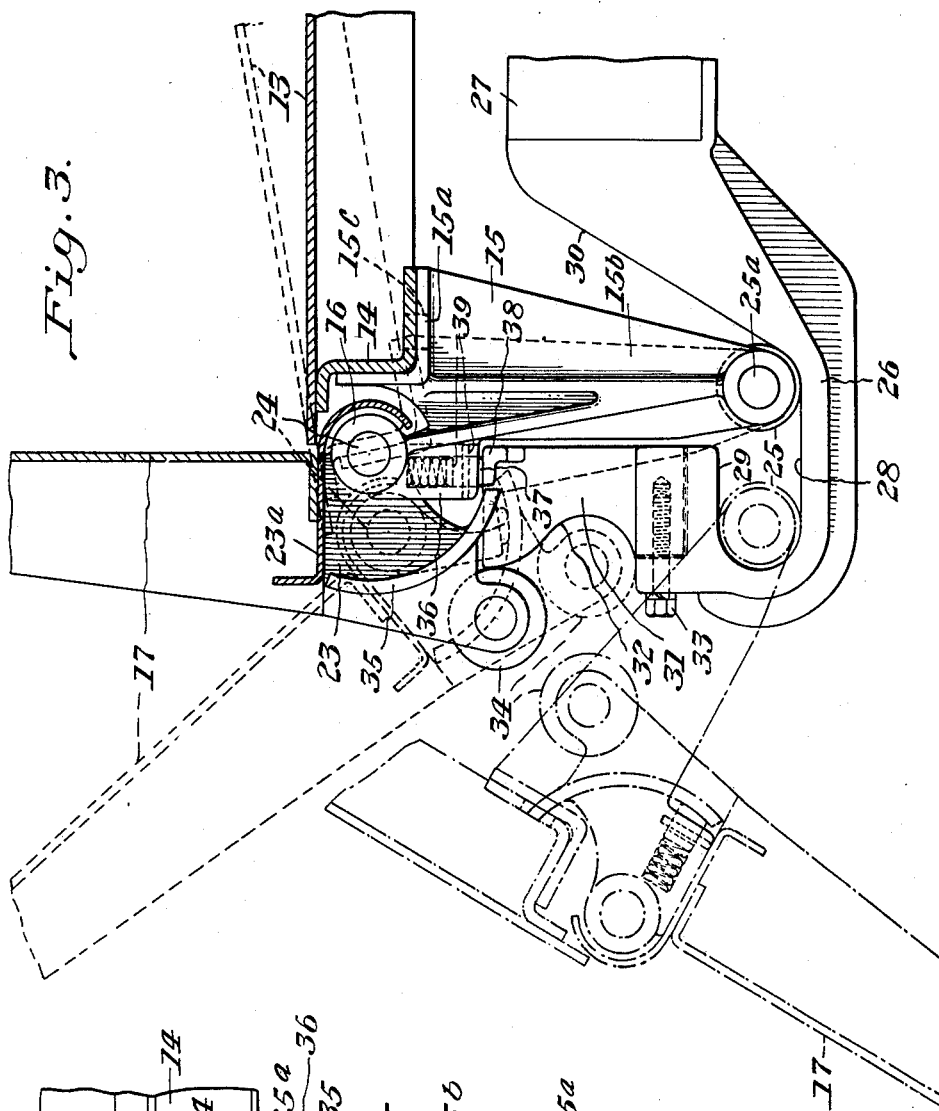
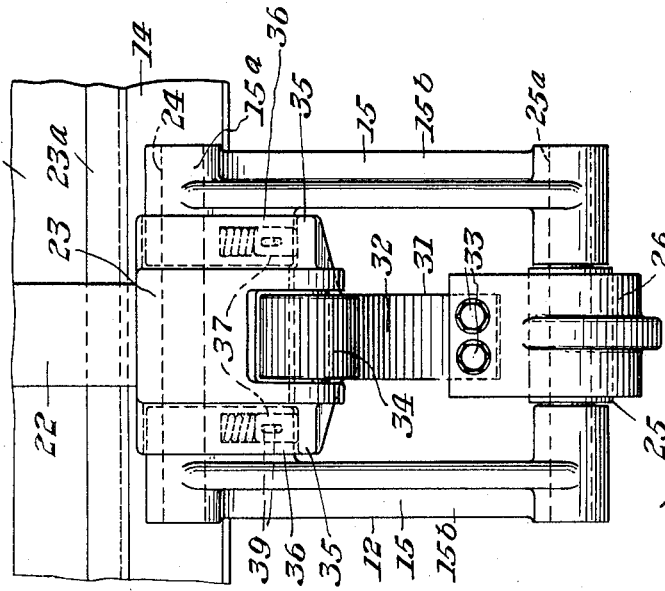

Patented May 29, 1934

1,960,833

UNITED STATES PATENT OFFICE 1,960,833

SELF-LOCKING DUMP BODY

William T. Stephens, Youngstown, Ohio, assignor to The Commercial Shearing & Stamping Company, Youngstown, Ohio, a corporation of Ohio Application June 9, 1932, Serial No. 616,227

9 Claims. (Cl. 298—12)

My invention relates to a tilting vehicle body and, in particular, to the mounting of the body upon a supporting chassis for dumping in three directions without the necessity of any mechanism for locking the body when dumping in various directions, or any complicated linkage for actuating such locking means, as well as to a novel arrangement of the hoist mechanism.

Three-way dumping bodies as now constructed are usually provided with a four-point support, each support being hinged and removable from a chassis-mounted receiver. Dumping of the body toward either side is effected by locking a pair of supports at the side toward which dumping is to be effected and applying a lifting force to the bottom of the body. Rear dumping is similarly carried out. While several successful dumping bodies of this type have been proposed, the mechanism for locking the body before dumping is quite complicated. Since such mechanism presents a continuous problem of safety and maintenance, aside from its manufacturing cost, it is obvious that a satisfactory tilting body without such mechanism would be highly desirable.

I have invented a vehicle body and a mounting therefor which permits tilting of the body in three directions, that is, to either side or to the rear, in which the locking of the body to its mounting is automatically effected during the early part of the tilting movement. In accordance with my invention, I mount a body on a vehicle chassis by means of a six-point suspension. The chassis is provided with six hinge bearings and the body with six cooperating hinge brackets whereby the body is supported on the chassis. Either side or end of the body may be freely raised from the hinge bearings supporting it. When one side or the front end of the body has been raised through a small angle, for example, ten degrees, however, the weight of the body or the contents thereof acting through dumping gates pivoted thereon, tends to shift the body relative to the hinge bearings supporting it. The hinge bearings are so shaped that after such movement of the body on the bearings, the hinge brackets on the side toward which dumping is being effected are securely held in the bearings for the completion of the dumping operation, while the others are free to be raised. As the body is lowered to horizontal position, it is again restored to its initial position relative to the supporting hinge bearings.

The dumping gates are automatically operated on tilting movement of the body. The gate on the side toward which tilting is being effected is opened rapidly to a limiting position such that it forms a continuation of the body bottom to constitute a spill plate for the load. The gate on the side of the body which is lifted is automatically locked against opening. When dumping to the rear, the rear gate is automatically opened and both side gates locked.

Since any side of the body may be freely raised vertically when the body is in normal horizontal position, the dumping force can safely be applied only at the side opposite that toward which dumping is to be effected. To this end, I mount a pair of hydraulic jacks, one adjacent each side of the body and both positioned ahead of the transverse center line thereof. Thus by operating either one of the jacks alone, the body may be dumped to either side as desired. By operating both jacks simultaneously, the body may be dumped to the rear. For controlling the jacks I employ a valve of the type described and claimed in the co-pending application of Proctor and Stephens, Serial No. 583,862, filed December 30, 1931, for Multiple control valve.

For a more complete understanding of the invention, reference is made to the accompanying drawings illustrating a present preferred embodiment. In the drawings:

Figure 1 is a side elevation;

Figure 2 is a rear elevation;

Figure 3 is a partial sectional view taken substantially on the line III—III of Figure 1;

Figure 4 is a side elevation to enlarged scale of one of the body-supporting hinges;

Figure 5 is a sectional view with parts in elevation taken along the line V—V of Figure 1; and Figure 6 is a diagrammatic view of the hydraulic circuit including a sectional showing of the control valve.

Referring in detail to the drawings, a dumping body is indicated at 10, a vehicle chasis at 11 and hinge supports for carrying the body on the chassis at 12. There are six such hinge supports, two on each side of the body and two at the rear thereof.

While the specific construction of the body is not material to the present invention, it preferably comprises a bottom 13 carried on a frame 14 composed of structural shapes such as Z-bars.

Each of the hinge supports 12 by which the body is carried on the chassis includes a hinge bracket 15. The hinge brackets are secured to the frame 14 in any desired manner and each bracket carries a bearing 16 for a dumping gate hinge. Side gates 17 and 18 and a rear gate 19 are pivotally supported in said bearings 16, by means which will be described presently, on pins 24. The body has a front wall 21 fixed to the frame 14.

Each of the doors 17, 18 and 19 is made of sheet metal and has reinforcing channels 22 spaced along the length thereof. At the bottom of at least two of the channels on each door, hinge castings 23 are fixed. The castings 23 have eyes therein adjacent their inner ends which cooperate with the bearings 16 and pins 24 extending therethrough to provide a pivotal mounting for the gates. Cover plates 23a extend around the bearings 16 to prevent the collection of dirt thereon. The hinge brackets 15, as shown in Figure 4, comprise a top portion 15a engaging the frame 14, and downwardly extending leg portions 15b. Between the leg portions 15b, at the lower ends thereof, the hinge brackets 15 are provided with rollers 25 mounted on pins 25a. The rollers of the hinge brackets on the sides of the body rest in hinge bearings 26. The bearings 26 form parts of front and rear transoms 27 resting on the longitudinal members of the chassis 11 and extending transversely thereof. The transoms 27, in addition to the hinge bearings 26, include central hollow portions 27a adapted to serve as fluid reservoirs, as will be described in greater detail later. The hinge bearings 26 each include a flat portion 28, a hook portion 29 and an inclined portion 30. A cam block 31 having a cam surface 32 is mounted above the hook portion 29 of each of the hinge bearings and is secured thereto by screws 33.

The lower end of each of the hinge castings 23 carries a roller 34 engaging the cam surfaces 32 of the blocks 31. The castings 23 are provided with integral ribs 35. The hinge brackets 15 have bosses 36 bored out to receive spring-pressed plungers 37. When the body is in horizontal position, the plungers 37 engage shoulders 38 on the cam blocks 31 and are thereby compressed into their sockets. When one side of the body is raised, the plungers 37 have a limited outward movement determined by pin and slot 39, whereby they extend into the path of the ribs 35 of the castings 23 to hold the gate closed.

The hinges 12 at the rear of the body are identical with those at the sides, which have just been described, with the exception that there are no spring-pressed plungers in the rear bearing brackets. The rear hinge bearings 26 are similar to those at the sides of the body except that they are parts of arms 40 extending rearwardly of the rear transom 27.

For tilting the body, I employ a pair of telescoping hydraulic jacks 41. One of these jacks is mounted adjacent each side of the body in a bifurcated yoke 42. The yokes 42 are rotatable in a transverse tube 43 extending across the chassis rails 11 and secured thereto in integral blocks 43a. Each of the yokes 42 has a portion extending within the tube 43 which is pinned to a cross bar 43b. The central pistons of the jacks are double trunnioned to the body frame at 44 so that the jacks 41 have universal movement with respect to both the chassis 11 and the body 10.

The jacks are controlled by a multiple valve 45 having operating levers 46 and 47 which are preferably connected by suitable linkages to control levers in the operator's cab of the vehicle on which the body is mounted. The valve 45 is mounted below the front transom 27 on a nipple 48. The central hollow portion 27a of the front transom serves as a reservoir for the fluid system.

The valve 45 is illustrated in some detail in Figure 6 and comprises a casting 49 having a low pressure passage 50 terminating in a port into which the nipple 48 is screwed, and a high pressure or inlet passage 51 connected by means of a conduit 52 screwed into a port communicating with the passage 51 and extending to a pump 53. The latter is not illustrated in detail but may be of any desired type and is preferably arranged to be driven from a power take-off mounted on the vehicle. A conduit 54 extends from the pump 53 to the reservoir 27a.

The valve casting 49 has outlet ports 55 adapted to be placed in communication with the high pressure passage 51 by properly positioning valve plugs 56 and 57 rotatably mounted in suitable transverse bores in the casting. Two of the ports 55 are closed by plugs 58. The other two communicate by conduits 59 and 60, respectively, to the jacks 41 on opposite sides of the chassis. As disclosed in the co-pending application above mentioned, when the valve plugs are in the illustrated position, a by-passing passage is opened to permit continuous circulation of fluid under low pressure through the pump and valve. Such details are omitted from the present disclosure since they are not necessary to an understanding of this invention. When the valve plug 56, for example, is moved to the dotted line position by operating its control lever 46, the conduit 59 is placed in communication with the passage 51 through a connecting passage 61 connecting the passage 51 to the bore in which the plug 56 is seated. The pump 53 thereupon builds up pressure in the jack 41 to which the conduit 59 is connected so as to extend the latter and raise one side of the body. Restoration of the valve plug 56 to the position illustrated in solid lines connects the conduit 59 and the jack cylinder to the low pressure passage 50 so that the weight of the body collapses the jack as the body descends. Similar operation of the valve plug 57 causes the extension of the jack 41 to which the conduit 60 is connected. Simultaneous operation of both valve plugs causes both jacks to exert upward pressure on the body immediately so that the latter is tilted toward the rear.

The actual operation of the structure for tiltably supporting the body will now be described.

Referring to Figures 1 and 2, it will be seen that although the body is supported on the six hinge brackets and bearings, it could be raised vertically without any interference since in the horizontal position, all portions of the hinge brackets clear the adjacent portions of the hinge bearings. As a result, extension of either one or both the jacks first causes an upward movement of one side or the front end of the body. As soon as the body has been tilted through a small angle, for example, ten degrees, the contents thereof tend to slide down toward the lower side of the body. If the right-hand jack 41, as seen in Figure 2, is extended, for example, the contents of the body will slide against the side gate 17. As the body tilts first about the axis of the rollers 25 at the bottom of the hinge brackets 15, the rollers 34 on the lower ends of the side gate bearing casings 23 travel downwardly along the surfaces 32 of the cam blocks 31. The torque exerted on the side gate 17 by the sliding contents of the body causes the body to be pulled toward the left, as seen in Figures 2 and 3, by reason of the engagement of the roller 34 with the cam surface 32.

This lateral movement of the body which occurs shortly after the initial tilting movement thereof places the rollers 25 under the hook portions 29 of the bearings 26, as shown in chain lines in Figures 2 and 3. The body is thereby locked against upward movement on the side toward which dumping is to be effected but continued tilting is not prevented.

The initial movement of the gate 17 takes it to the dotted line position of Figure 3 but on completion of the tilting, as shown in chain lines in Figures 2 and 3, the gate is fully opened and lies in a plane substantially parallel to that of the body bottom 13. The extreme ends of the ribs 35 on the castings 23 enter holes 15c in the upper portion 15a of the bracket 15 and the horizontal flange of the Z-bar 14 to limit the extreme position of the gate.

When the load has been discharged, release of the pressure in the jack cylinder permits the body to descend by its own weight. It returns first to the dotted line position of Figure 3, whereupon the roller 34 engages the cam surface 32 and begins to close the gate 17. Further lowering movement of the body causes the rollers 25 on the opposite sides to engage the cam surfaces 30 of the bearings 26 on that side. As the rollers 25 on the high side of the body roll down the cam surfaces 30, the body is gradually shifted laterally and restored to its original position, as shown in solid lines in Figure 2.

Obviously, tilting of the body to the opposite side is accomplished in a similar manner by operating the appropriate valve plug. Rear dumping is also likewise effected by operating both valve plugs simultaneously. When lowering the body after dumping to the rear, it is shifted longitudinally of the axis by cam rolls and cam surfaces 62 and 63 mounted, respectively, on the body and chassis. These cam rolls and surfaces operate in the same manner as the rolls 25 in the surfaces 30.

The advantages of the invention described herein will be readily apparent. The mechanism for tiltably supporting the body is considerably simpler and correspondingly less expensive than any which has previously been used, and all complicated linkages and movements are avoided. The only control necessary is that of the lifting jacks, since the body is automatically locked after the first few degrees of lift in any dumping operation. The gates open automatically on the side toward which dumping is being effected, while the remaining gates are locked. While the locking movement of the body is effected more positively when the body is loaded, the weight of the unloaded body will be sufficient to cause locking movement thereof in case it is desired to tilt the body while empty. Since the jacks are universally mounted on the chassis and similarly connected to the body, they can move in any direction for dumping to either side or to the rear. One feature of the hydraulic system is that in the case of side tilting, the idle jack is connected to the low pressure side of the system so that if it is slightly extended, it will fill with oil and not suck in air which is detrimental to the satisfactory operation of the system.

The invention provides a very simple form of body tilting mechanism which does not require much maintenance and is designed to have a long, useful life.

Although I have illustrated and described herein but one preferred embodiment of the invention, it will be obvious that it may be embodied in numerous forms other than that disclosed. Any such changes which do not involve a departure from the spirit of the invention, of course, are comprehended within the scope of the appended claims.

I claim:

1. The combination with a vehicle chassis having hinge bearings thereon, of a body having hinge brackets co-operating with said bearings, gates pivoted to the body, means on said chassis for tilting said body on said brackets, and means including said gates for shifting the body in the direction of tilting to lock the brackets to the bearings.

2. A tilting vehicle body comprising a pair of transoms adapted to rest on a vehicle chassis, having hinge bearings at either end thereof, a body removably supported on brackets interfitting with said bearings, means for tilting the body about an axis through a pair of said brackets, a gate on said body, and means associated with the body and transoms, and adapted to be actuated by the impact of the body contents against said gate on tilting, for shifting the body relative to the transoms.

3. A tilting vehicle body comprising a pair of transoms adapted to be supported on a vehicle chassis, hinge bearings at either end of the transoms, a body supported by said transoms on brackets cooperating with said bearings, a gate on said body, means for tilting the body about an axis through a pair of said brackets, means actuated by the impact of the body contents on said gate, including a cam surface on the bearing and a roller on the gate for shifting the body relative to the transoms, hook portions on said bearings for locking said pair of brackets thereto, and cam surfaces on said bearings for restoring the body to its initial position on lowering movement thereof.

4. In a tilting vehicle body, a gate hinged adjacent its lower edge to said body, normally separable hinge members for supporting said body, said members having locking means engageable on relative lateral movement thereof, means for tilting the body about the edge to which the gate is hinged, and gate-operated means engaging certain of said members for shifting the body laterally relative to said last-mentioned members upon a predetermined tilting movement of the body.

5. The combination with a vehicle chassis, a body tiltably mounted thereon, and supporting members between the chassis and body, normally disengageable but adapted to lock together on relative lateral movement, of means supported on the chassis for raising an edge of the body, and means including gates pivoted on the body and cooperating cam means on the gates and said members, adapted to be actuated by movement of the contents of the body, and effective to shift the latter to rotatably lock one edge of the body on elevation of the opposite edge.

6. A tilting vehicle body comprising a pair of transverse members adapted to rest on a vehicle chassis, hinge bearings at each end of each of said members having horizontal supporting surfaces, a body supported on hinge brackets engaging said surfaces, means for tilting said body on said brackets, said bearings having projections for rotatably locking the brackets thereto on shifting movement of the body, gates pivoted to the edges of the body, and means operated by the partial opening of the gate on the edge toward which the body is tilted for moving the body horizontally on said surfaces whereby the brackets engage said projections.

7. The combination with a pair of transverse members having bearing surfaces at the ends thereof, of a body having bearing brackets engaging said surfaces, a gate hinged adjacent its lower edge to said body, a plunger reciprocable in one of said brackets for locking the gate in closed position on lifting movement of the body, and means on said transverse members for retracting said plunger when the body is in horizontal position.

8. A mounting for a tilting vehicle body comprising pairs of hinge brackets projecting downwardly from the rear and side edges of the body, means for lifting either side or the front edge of the body, and supporting members on the vehicle chassis providing laterally extending bearing surfaces for said brackets, said members having locking hooks at the outer ends of said surfaces, whereby, on lifting one of its edges, the body shifts horizontally, so that the brackets on the lowermost edge engage the locking hooks of the associated supporting members and secure said lowermost edge to the chassis for further angular movement of the body.

9. A mounting for a tilting vehicle body comprising a pair of hinge brackets projecting downwardly from the rear and side edges of the body, means for lifting either side or the front edge of the body, and supporting members on the vehicle chassis providing substantially horizontal bearing surfaces for said brackets and locking hooks at the outer ends of said surfaces, gates pivoted to said side and rear edges of the body, and cooperating cam means on said gates and said members whereby opening of one of the gates tends to shift the body horizontally so that said brackets on the same edge of the body as said one of the gates engage their locking hooks to secure said edge for further angular movement of the body.

WILLIAM T. STEPHENS.